United States Patent [19]
Pierce

[11] 3,889,153
[45] June 10, 1975

[54] POWER SOURCE FOR FLUORESCENT LAMPS AND THE LIKE

[75] Inventor: John T. Pierce, Chemlsford, Mass.

[73] Assignee: Iota Engineering Inc., Tucson, Ariz.

[22] Filed: Oct. 1, 1973

[21] Appl. No.: 402,317

[52] U.S. Cl.............. 315/209 R; 307/202; 315/101;
315/205; 315/DIG. 5; 315/DIG. 7; 317/13 B;
317/33 R; 321/14; 331/62; 331/148
[51] Int. Cl........................ H02h 7/10; H05b 41/29
[58] Field of Search............ 315/DIG. 5, DIG. 7, 94,
315/95, 97, 99, 101, 205, 209 R; 331/62,
112, 146, 148, 176, 113 A; 321/2, 14;
317/13 B, 33 R, 40 R; 307/202

[56] References Cited
UNITED STATES PATENTS

| | | |
|---|---|---|
| 3,159,799 | 12/1964 | Cooper, Jr. .......................... 331/112 |
| 3,161,834 | 12/1964 | Noyes, Jr. ............................. 331/62 |
| 3,225,255 | 12/1965 | Hume ................................. 315/232 |
| 3,370,201 | 2/1968 | Ward............................. 317/40 RX |
| 3,389,298 | 6/1968 | Skirvin................................ 315/206 |
| 3,535,612 | 10/1970 | Judd et al. ......................... 321/14 X |
| 3,662,249 | 5/1972 | Wijsboom ..................... 331/113 AX |
| 3,700,956 | 10/1972 | Cluett................................. 315/101 |
| 3,753,071 | 8/1973 | Engel et al................. 315/DIG. 7 X |

Primary Examiner—James W. Lawrence
Assistant Examiner—E. R. La Roche
Attorney, Agent, or Firm—Harris, Kern, Wallen & Tinsley

[57] ABSTRACT

A power source for operating gas discharge lamps and other loads at high frequency from a high voltage supply, typically using 115 volts ac supply and providing a 20,000 hertz output. An inverter and lamp ballast circuit with fast starting circuitry and open circuit protection.

5 Claims, 1 Drawing Figure

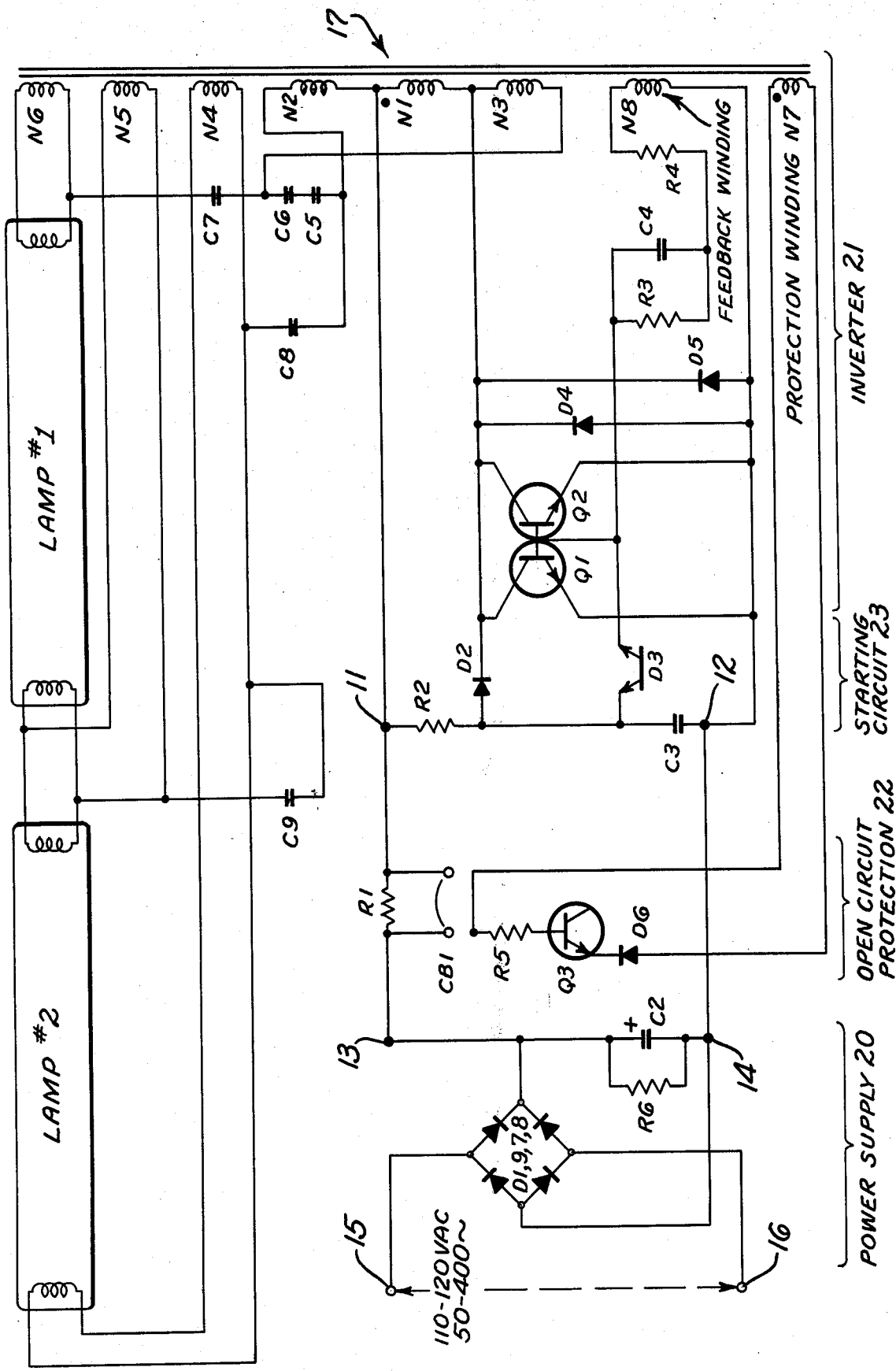

POWER SOURCE FOR FLUORESCENT LAMPS AND THE LIKE

This invention relates to a power source for gas discharge lamps and other loads operated at high frequency, and in particular is directed to a new and improved power source suitable for operation from a 115 volt ac supply for energizing large fluorescent lamps with improved light output, lower power consumption, and high reliability. The present circuit is an improvement on that shown in U.S. Pat. No. to Campbell 3,396,307.

The power source of the present invention has an inverter and ballast circuit generally similar to that of the Campbell patent with variations permitting operation at higher input voltages and improved efficiencies. The new power source also includes a protection circuit for protecting the inverter from self destruction in the event of removal of the load, and a starter circuit for reliably initiating inverter oscillation for dependable lamp starts. The specific embodiment described will operate two 8' fluorscent lamps connected in series from a 115 volt ac supply. However it will readily be understood that the invention is not limited to this particular end use and that the novel power source is readily adapted for driving other loads as well as lamps of other types and sizes.

The single figure of the drawing is a circuit diagram of a power source for operating two lamps and incorporating the presently preferred embodiment of the invention.

The power source includes a power supply section 20, an inverter 21, an open circuit protection section 22, and a starting circuit 23. The particular power source illustrated is intended for operation from a 115 volt ac supply which may be connected at terminals 15, 16, and will operate two 8' fluorescent lamps indicated as lamp No. 1 and lamp No. 2

The inverter 21 utilizes two parallel npn transistors Q1, Q2 connected through their collector-emitter path in series with the primary winding N1 of an autotransformer 17. Two transistors are used in parallel to enhance their gain within the circuit and to enhance their resistance to damage from the large collector-emitter saturation voltages encountered during the nonlinear inverter operation for driving high voltage gas discharge lamps.

Feedback sufficient to accomplish fast switching during inverter operation is provided to the transistor bases through a drive resistor R3 shunted by a capacitor C4. Resistor R3 has a positive resistance versus temperature characteristic and is thermally coupled to the ambient atmosphere. Therefore the resistance of R3 changes with ambient temperature to stabilize otherwise undesirable variations in light output from the lamps. The base feedback drive combination is connected in series with another resistor R4 and transformer feedback winding N8, which preferably is a separate transformer winding not included as part of the primary N1 and secondary N2, N3 transformer winding combination. The separate transformer winding N8 for feedback base drive of the inverter is used because of wiring polarity considerations for npn transistors, which are preferred for their superior switching speed and lower cost.

In the power supply 20, diodes D11 and D8 are connected in series with each other and the combination connected in parallel with the series combination of diodes D7 and D9. These diodes comprise a standard full wave rectifier circuit where the ac input is converted to filtered dc output through the use of capacitor C2 connected in parallel with the full-wave rectifier. Resistor R6 is connected in parallel with filter capacitor C2 to quickly discharge C2 for safety when ac power is removed. The rectified dc voltage is applied across points 11, 12 through a thermal circuit breaker CB1, which is normally closed, short circuiting resistor R1. The inverter 21 operates from rectified ac voltage but is not limited to operation from such a source. A dc voltage applied at points 13, 14 from any dc power source will operate the circuit. Hence the unit may be operated equally well from an ac line and from a dc standby. The specific circuit illustrated operates at 150 volts dc, which is twelve and one-half times greater than the operating voltage used in the aforementioned Campbell patent.

Inverter operation and transformer action are similar to that described in the Campbell patent. The transformer 17 includes a ferrite core which saturates at a given voltagetime product and, along with capacitors C7 and C8, limits the current available for lamp operation. During inverter oscillation, a voltage is induced in transformer windings N2 and N3 which along with winding N1 form the secondary of the autotransformer. This induced voltage across the autotransformer is sufficient to start and drive lamps No. 1 and No. 2. Voltage induced in winding N8 provides in-phase feedback to the transistor bases to provide transistor drive. Voltage induced in windings N4, N5 and N6 may be applied to the lamp filaments to heat the filaments for rapid-start operation.

The capacitive ballasting of lamps 1 and 2 is similar to that of the prior art. Capacitors C5 and C6 serve as a load on the inverter circit upon application of ac power but before starting of the lamps. Capacitors C5 and C6 provide energy storage capability to prevent the occurrence of high voltages in the transformer winding which could destroy the transistors Q1 and Q2. Capacitors C7 and C8 are connected in series with the lamps and the secondary transformer windings N2 and N3. C7 and C8, along with the operational inverter frequency and secondary voltage, limit the current available to drive the lamps. Capacitor C9 is connected in parallel with lamp No. 2 to provide standard series sequence start capability for two lamps. Capacitor C9 provides a short circuit for the high voltage oscillating at the inverter frequency. Thus, when the high voltage from the inverter is initially applied, lamp No. 2 is short circuited and lamp No. 1 fires. As lamp No. 1 begins to conduct, a high voltage drop occurs across lamp No. 2 causing it to fire in sequence to lamp No. 1.

The circuit may be used for single lamp operation by omitting lamp No. 2 and the associated components N2, N4, C8 and C9, with the junction of C5 and C8 connected to the winding N1 and with a direct connection from C8 to lamp No. 1 in place of lamp No. 2 and C9.

The starting circuit 23 provides a unique and reliable way of initiating oscillation in the inverter circuit. The starting circuit is comprised of resistor R2, diode D2, diac D3, and capacitor C3. When voltage is applied between R2 and C3, R2 allows C3 to charge. D2 is reverse biased and does not conduct. The charging continues until the voltage across D3 exceeds its breakover voltage. Device D3 then conducts, applying a current pulse from C3 to the bases of Q1 and Q2. The bases are then instantaneously positive with respect to the emitters allowing emitter-collector conduction, and oscillation of the inverter is thus initiated. Resistor R2 is selected such that at the nominal input voltage during inverter operation, it will not maintain D3 in conduction.

During the oscillation of the inverter, diode D2 is forward biased and C3 continues to charge but is continually discharged by D2 during each half cycle of inverter operation. The charge voltage on C3 during oscillation never reaches the break-over voltage of D3. Of course, the circuit is not limited to the use the aforementioned components and other breakdown devices such as a unijunction transistor may be used in place of the diac D3.

The present invention is more efficient for 115 VAC operation than the conventional method for inverter starting using a collector-base resistor to provide reliable starts. An unusually large resistor would be required to initiate starting in the conventional fashion which, due to the higher operating voltage of the present system, would be a highly dissipative and inefficient component.

During normal operation with series lamps in the inverter/ballast circuit, the voltage across transformer winding N7 is low enough that no appreciable current flows through the combination of diode D6, transistor Q3 (operated in an emitter-base Zener mode), and resistor R5 of the open circuit protection unit 22. Since lamps 1 and 2 are connected in series, the starting burn out or removal of either lamp from the circuit causes an open circuit condition to occur such that there is no load on or current flow through the ballast circuit. Consequently, the voltage across the transformer primary N1 increases during the transistor turn-off portion of the inverter cycle. The increased voltage causes excess current in the feedback components of the inverter circuit, R4, C4, R3 and collector-base transistor junctions of Q1 and Q2. Prolonged continuation of this increased current would overheat Q1 and Q2, eventually causing the short circuit of collector and base. Furthermore, excessive heating of Q1, Q2, R3 and R4 would cause an increase in the ambient temperature of a closed environment. Prolonged temperatures in excess of 85°C are damaging to capacitors C5, C6, C7 and C8.

Therefore, a unique protective circuit is used to limit input power, greatly reducing collector-base current during open circuit operation, thereby preventing transistor destruction and damage to other components. Diodes D4 and D5 take up excess reverse current flowing during open circuit operation. Two diodes are used for added reliability while feedback component dissipation is high. In addition, they aid the prevention of damage to Q1 and Q2 until the action of the thermal circuit breaker CB1 occurs.

The voltage across transformer winding N7 increases during open circuit operation. Diode D6 chops the voltage from N7 allowing only the half-cycle voltage of positive polarity to pass. This voltage reverse biases transistor Q3 whose purpose is to act solely as a low cost zener diode during open circuit operation. Transistor Q3 is in the zener mode of operation only when the open circuit situation occurs and the voltage across N7 is sufficiently large.

The current flow during open circuit causes resistor R5 and the transistor Q3 to heat. R5, Q3, R1 and thermal circuit breaker CB1 are mounted in thermal contact. Heating of R5 and Q3 also heats CB1 until the contacts in CB1 open at approximately 85°C, placing R1 in series with N1. Upon the opening of the contacts in CB1, the dc current flowing through transformer winding N1 and transistors Q1 and Q2 drops to a negligible value since the current is limited by resistor R1. In addition, this reduction in dc current reduces the current through D6, Q3, and R5, removing the source of heat which originally caused the CB1 contacts to open. However, the current limiting resistor R1 has become hot enough after the opening of the CB1 contacts to keep the temperature high enough for the contacts to remain open. After the opening of the CB1 contacts, these contacts will remain open until ac power is disconnected, and resistor R1 and CB1 cool below 85°C. Variations in the protective circuitry for the inverter/ballast may be utilized. For example, thermal separation of resistor R1 from CB1 would cause the cycling of CB1 and on-off cycling of the inverter/ballast in step with the cooling and heating of Q3 and R5. Such operation in the no load open circuit situation might be desirable for some applications.

The power source may be operated from standard 115 volt ac lines and provides a high frequency output, typically 20,000 hertz.

Typical values for circuit components are given by way of example and not for the purpose of limiting the invention:

| R1 | 1.5 | Kohms | N5 | 1 turn |
|----|-----|-------|----|----|
| R2 | 150 | Kohms | N6 | 1 turn |
| R3 | 56 | ohms | N7 | 1 turn |
| R4 | 4 | ohms | | |
| R5 | 1 | ohm | | |
| R6 | 33 | Kohms | | |
| Q1 | SJ 5276 | | | |
| Q2 | SJ 5276 | | | |
| Q3 | MJE 3055 | | | |
| D1 | MR 752 | | | |
| D2 | 1N4006 | | | |
| D3 | 1N5761 | | | |
| D4 | 1N4006 | | | |
| D5 | 1N4006 | | | |
| D6 | 1N4002 | | | |
| D7 | MR752 | | | |
| D8 | MR752 | | | |
| D9 | MR752 | | | |
| C2 | 550 mfd | | | |
| C3 | .1 mfd | | | |
| C4 | .47 mfd | | | |
| C5 | .01 mfd | | | |
| C6 | .01 mfd | | | |
| C7 | .033 mfd | | | |
| C8 | .033 mfd | | | |
| C9 | .0015 mfd | | | |
| N1 | 25 turns | | | |
| N2 | 40 turns | | | |
| N3 | 40 turns | | | |
| N4 | 1 turn | | | |

I claim:

1. In a high frequency, high voltage power source for a load such as gas discharge lamps, the combination of:
an inverter comprising an oscillator circuit and transformer, said transformer having primary, secondary and feedback windings, said oscillator circuit including a transistor having emitter and collector electrodes connected in series with said primary winding across a pair of dc input terminals and having the base and one of said electrodes connected across said feedback winding;
an inverter starting circuit including a first resistor and first capacitor connected in series across said dc input terminals, and a breakdown device connected between the junction of said resistor and capacitor and said base, with said capacitor charging through said resistor and discharging through said breakdown device providing a starting current pulse to said transistor;

a protection winding on said transformer;

a second resistor connected in series at one of said dc input terminals;

a thermal circuit breaker for shunting said second resistor; and heating circuit means connected across said protection winding and positioned adjacent said circuit breaker;

with said transformer providing an increased output at said protection winding when there is no load at said secondary winding for energizing said heating circuit means and actuating said circuit breaker to the open condition and developing a voltage drop across said second resistor reducing the current in said primary winding and transistor, and with said heating circuit means including a third resistor for heating said circuit breaker and a second breakdown device permitting current flow through said third resistor from said protection winding when the protection winding voltage exceeds a predetermined amount.

2. A power source as defined in claim 1 including a second diode device connected across said transistor collector and emitter electrodes.

3. In a high frequency, high voltage power source for a load such as gas discharge lamps, the combination of:

an inverter comprising an oscillator circuit and transformer, said transformer having primary, secondary and feedback windings, said oscillator circuit including a transistor having emitter and collector electrodes connected in series with said primary winding across a pair of dc input terminals and having the base and one of said electrodes connected across said feedback winding;

an inverter starting circuit including a first resistor and first capacitor connected in series across said dc input terminals, and a breakdown device connected between the junction of said resistor and capacitor and said base, with said capacitor charging through said resistor and discharging through said breakdown device providing a starting current pulse to said transistor;

a protection winding on said transformer;

a second resistor connected in series at one of said dc input terminals;

a thermal circuit breaker for shunting said second resistor; and heating circuit means connected across said protection winding and positioned adjacent said circuit breaker with said transformer providing an increased output at said protection winding when there is no load at said secondary winding for energizing said heating circuit means and actuating said circuit breaker to the open condition and developing a voltage drop across said second resistor reducing the current in said primary winding and transistor, and with said second resistor in thermal contact with said circuit breaker for operation as a second heating circuit means.

4. In a high frequency, high voltage power source for a load such as gas discharge lamps, the combination of:

an inverter comprising an oscillator circuit and transformer, said transformer having primary, secondary and feedback windings, said oscillator including a transistor having emitter and collector electrodes connected in series with said primary winding across a pair of dc input terminals and having the base and one of said electrodes connected across said feedback winding; and a protection circuit including a protection winding on said transformer, a first resistor connected in series at one of said dc input terminals, a thermal circuit breaker for shunting said first resistor, and heating circuit means connected across said protection winding and positioned adjacent said circuit breaker, said heating circuit means including a second resistor for heating said circuit breaker and a breakdown device permitting current flow through said second resistor from said protection winding when the protection winding voltage exceeds a predetermined amount;

with said transformer providing an increased output at said protection winding when there is no load at said secondary winding for energizing said heating circuit means and actuating said circuit breaker to the open condition and developing a voltage drop across said first resistor reducing the current in said primary winding and transistor.

5. A power source as defined in claim 4 including a diode device connected across said transistor collector and emitter electrodes.

* * * * *